US006446223B1

(12) United States Patent
Morishita et al.

(10) Patent No.: US 6,446,223 B1
(45) Date of Patent: Sep. 3, 2002

(54) STORAGE SYSTEM AND METHOD FOR CONTROLLING THE SAME

(75) Inventors: Noboru Morishita, Fujisawa; Akira Yamamoto, Sagamihara, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/391,491

(22) Filed: Sep. 8, 1999

(30) Foreign Application Priority Data

Sep. 9, 1998 (JP) .......................................... 10-255120

(51) Int. Cl.⁷ .............................................. G06F 11/00
(52) U.S. Cl. .............................. 714/47; 714/7; 711/162
(58) Field of Search .............................. 714/7, 5, 47, 6, 714/8, 710; 369/30.28, 30.22; 711/162

(56) References Cited

U.S. PATENT DOCUMENTS

| | | | | |
|---|---|---|---|---|
| 4,093,985 A | * | 6/1978 | Das ................................ | 714/5 |
| 4,430,727 A | * | 2/1984 | Moore et al. ................ | 711/115 |
| 4,984,230 A | * | 1/1991 | Satoh et al. ............. | 369/53.17 |
| 5,233,591 A | * | 8/1993 | Nishihara ..................... | 360/69 |
| 5,267,242 A | * | 11/1993 | Lavallee et al. ................ | 714/7 |
| 5,297,148 A | * | 3/1994 | Harari et al. .......... | 365/185.09 |
| 5,497,457 A | * | 3/1996 | Ford ........................... | 714/15 |
| 5,535,328 A | * | 7/1996 | Harari et al. ................ | 365/218 |
| 5,737,742 A | | 4/1998 | Achiwa et al. | |
| 5,764,972 A | * | 6/1998 | Crouse et al. .................. | 707/1 |
| 5,832,200 A | * | 11/1998 | Yoda .......................... | 711/115 |
| 5,930,193 A | | 7/1999 | Achiwa et al. | |
| 5,943,688 A | * | 8/1999 | Fisher et al. ................ | 711/162 |
| 6,038,680 A | * | 3/2000 | Olarig ........................... | 714/6 |
| 6,041,421 A | * | 3/2000 | Yamamoto ..................... | 714/7 |
| 6,119,245 A | * | 9/2000 | Hiratsuka ..................... | 360/48 |
| 6,351,825 B1 | * | 2/2002 | Kaneda et al. ......... | 365/185.09 |
| 6,373,800 B1 | * | 4/2002 | Takahashi ................... | 714/27 |

FOREIGN PATENT DOCUMENTS

JP        9-54726        2/1997

OTHER PUBLICATIONS

Ford et al., "Redundant Arrays of Independent Libraries (RAIL): A Tertiary Storage System", Feb. 1996, Compcon '96: 'Technologies for the Information Superhighway' Digest of Papers, pp. 280–285.*

International Business Machines Corp, "Sector data re–write method for e.g. CD–RW—involves operation of logging the number of uses of a sector in the sector header", RD 413099 A, Sep. 10, 1998, Derwent Information.*

* cited by examiner

Primary Examiner—Robert Beausoleil
Assistant Examiner—Gabriel Chu
(74) Attorney, Agent, or Firm—Mattingly, Stanger & Malur, P.C.

(57) ABSTRACT

A storage system having a plurality of rewritable removable media and a method for controlling that system are disclosed. The storage system has a controller that updates medium update count management information every time contents of any medium are updated. When the update count for a medium is judged to have exceeded a predetermined threshold value, the controller starts a spare medium copy process whereby the contents of the medium with its update count found higher than was predetermined are copied to a spare medium. After the copying, the spare medium is transported to a cabinet for storage therein in place of the original medium whose contents have been copied, and the original medium is ejected from an outlet port. When a spare medium loading process is started from a service terminal, a spare medium put through an inlet port is loaded into the cabinet to replenish the spare medium inventory. In this manner, the storage system utilizing removable media each subject to a maximum allowable update count has these media replaced without manual intervention and without stoppage of system operation.

14 Claims, 16 Drawing Sheets

STORAGE SYSTEM AND METHOD FOR CONTROLLING THE SAME

BACKGROUND OF THE INVENTION

The present invention relates to a storage system and, more particularly, to a storage system that utilizes a plurality of removable storage media each subject to a predetermined maximum allowable update count.

Storage devices frequently used by computer systems include magnetic tapes and optical storage units in addition to magnetic disk drives. With each of these storage devices, media for data storage and a drive for writing and reading data to and from a medium are physically separated. A storage medium is loaded into the drive for a data write or read operation. These media are generally called removable media. One such medium attracting attention today is the DVD (Digital Video Disk).

Some media including the DVD-RAM and flash memory are each subject to a maximum allowable update count. The reason for this is that regions of a medium where data updates are repeated are prone to become unstable in data retention. If worst comes to worst, data will be lost through repeated updates. For example, the DVD-RAM may typically have its contents updated up to about 100,000 times; the flash memory, $10^5$ times.

Japanese Patent Laid-open No. Hei 9-54726 discloses a storage apparatus enabling a flash memory subject to a maximum update count to be utilized more efficiently than before. The disclosed storage apparatus employs a flash memory in which data are erased in units of blocks each made of a plurality of sectors. Each block is assigned spare sectors. If data cannot be written to a sector, they are written to a spare sector of the same block. In that case, the logical addresses of the sectors are switched. If all spare sectors of a block have been exhausted, all data of that block are copied to an unused block, and the logical addresses of all sectors involved are switched.

SUMMARY OF THE INVENTION

One disadvantage of the conventional storage apparatus outlined above is that it has no provision for a case where all available blocks (and their spare sectors) have been used up within the flash memory, i.e., where all spare storage regions have been exhausted. In that case, the flash memory chip could conceivably be replaced by another chip. However, usually fixed to a board inside the storage apparatus, the flash memory chip is not easy to replace. On the other hand, if the storage apparatus utilizes removable media such as the DVD-RAM, the media are much easier to replace than the flash memory, except that they must be removed manually.

It is therefore an object of the present invention to provide a storage system utilizing removable media each subject to a maximum update count, wherein the media are replaced without intervention of an operator.

In carrying out the invention and according to one aspect thereof, there is provided a storage system comprising: a cabinet for accommodating a plurality of rewritable removable media; reading and writing means for performing read and write operations on the removable media; a transporter for transporting the removable media between the cabinet and the reading and writing means; and a controller for controlling the reading and writing means and the transporter. The controller manages an update count for each removable medium being used and, if the update count is found to exceed a predetermined threshold value for a first removable medium, copies contents of the first removable medium to a second removable medium so that after the copying, the second removable medium is used in place of the first removable medium.

In a preferred structure according to the invention, the controller may manage use status of spare regions in each removable medium instead of its update count. If, in response to a write request from a host computer, an attempt is made to update regions of a removable medium and fails, then the controller may update the use status of the spare regions of the removable medium in question while copying contents of the regions whose update failed to the spare regions. Thereafter the newly copied spare regions may be used in place of the failed regions. If an available size of the spare regions is found to be less than a predetermined threshold value for the first removable medium, the controller may copy contents of the first removable medium to the second removable medium.

According to another aspect of the invention, there is provided a storage system comprising: a cabinet for accommodating a plurality of rewritable removable media; at least two drives for performing read and write operations on the removable media; a transporter for transporting the removable media between the cabinet and the drives; and a controller for controlling the drives and the transporter. The controller holds update count management information for managing an update count for each of the removable medium being used. In response to a write request from a host computer, the controller causes the transporter to transport a first removable medium to which to write data from the cabinet to a first drive. Every time a data write operation is performed on the first removable medium, the controller updates update count management information by which to manage an update count for each of the removable media. When the update count for the first removable medium is found to have exceeded a predetermined threshold value, the controller causes the transporter to transport a spare second removable medium from the cabinet to a second drive. The controller copies data held on the first removable medium to the second removable medium before causing the controller to transport the second removable medium to the cabinet for storage therein in place of the first removable medium.

In another preferred structure according to the invention, each removable medium may be divided into a plurality of regions each subject to management of an update count for the medium in question. Alternatively, update count management information may be divided and assigned individually to the removable media being used, so that update count management information about a given removable medium may be stored on that medium.

In a further preferred structure according to the invention, the storage system may comprise an ejecting element for ejecting the removable media. The controller may cause the transporter to transport to the ejecting element the first removable medium whose contents have been copied to the second removable medium. In an even further preferred structure according to the invention, the storage system may comprise a loading element for loading removable media from outside. The controller may cause the transporter to transport a removable medium placed in the loading element to the cabinet for storage therein as a spare removable medium.

If it takes a long time to copy data to a spare medium, the copying process may be halted temporarily to accept read/write requests from the host computer. In such a case, two kinds of information need to be retained: information for identifying a copy source medium and a copy destination medium (e.g., copy source medium number and copy destination medium number), and information denoting the progress of the copying process up to the point of interruption (e.g., copy start record number).

According to a further aspect of the invention, there is provided a controlling method for use with a storage system having a plurality of rewritable removable media, comprising the steps of: managing an update count for each removable medium; if the update count is found to exceed a predetermined threshold value for a first removable medium, copying contents of the first removable medium to a second removable medium; and using the second removable medium in place of the first removable medium after the copying.

Preferably, not an update count of each removable medium being used but use status of its spare regions may be managed by the inventive controlling method. If an attempt to update regions of a removable medium fails, the use status of the spare regions of the removable medium in question may be updated while contents of the regions whose update failed are copied to the spare regions. Thereafter the newly copied spare regions may be used in place of the failed regions. If an available size of the spare regions is found to be less than a predetermined threshold value for the first removable medium, contents of the first removable medium may be copied to the second removable medium.

Preferably, the first removable medium whose contents have been copied to another removable medium is ejected out of the storage system. A removable medium may be loaded into the storage system from outside so that the loaded medium may be used as a spare second removable medium.

Other objects, features and advantages of the invention will become more apparent upon a reading of the following description and appended drawings.

DETAILED DESCRIPTION OF THE PREFERRED EMBODIMENTS

Figure 1:
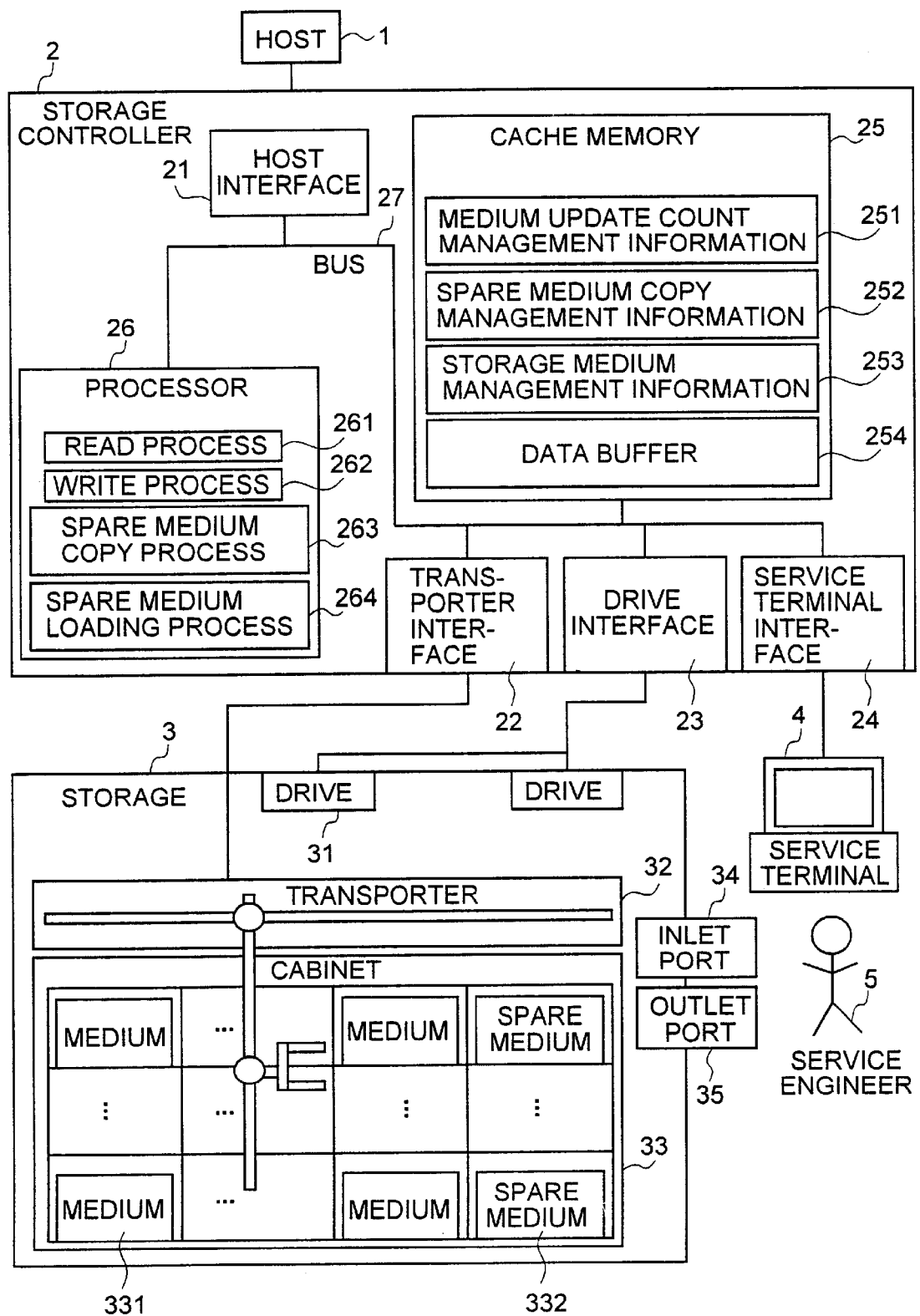
FIG. 1 is a block diagram of a storage system practiced as a first embodiment of this invention.

FIG. 1 is a block diagram of a storage system practiced as the first embodiment of this invention. As shown in FIG. 1, the storage system comprises a storage controller 2, a storage 3, and a service terminal 4. In response to read and write requests from a host computer 1, the storage system performs suitable processes accordingly.

The storage controller 2 includes a host interface 21, a transporter interface 22, a drive interface 23, a service terminal interface 24, a cache memory 25, and a processor 26. These components are interconnected by a bus 27. The storage controller 2 is connected to the host computer 1 through the host interface 21; to the storage 3 through the transporter interface 22 and drive interface 23; and to the service terminal 4 through the service terminal interface 24. The service terminal 4 is operated by a service engineer 5 maintaining the storage system.

The cache memory 25 comprises regions for storing medium update count management information 251, spare medium copy management information 252, and storage medium management information 253 in addition to a data buffer 254.

The processor 26 performs a read process 261, a write process 262, a spare medium copy process 263, and a spare medium loading process 264. The processor 26 is illustratively made of a central processing unit (CPU) and a memory. The memory possessed by the processor 26 contains programs for carrying out the read process 261, write process, 262, spare medium copy process 263, and spare medium loading process 264. The processor 26 causes its CPU to execute these programs when implementing functions of the storage controller 2. Details of these processes will be described later.

The storage 3 comprises at least two drives 31 for writing and reading data to and from storage media (simply called the media hereunder), a transporter 32, a cabinet 33, an inlet port 34 through which to add media to the system, and an outlet port 35 through which to eject media from the system.

The cabinet 33 contains currently used media 331 and unused spare media 332. The shelves of the cabinet accommodating the current media 331 and spare media 332 are given numbers identifying the media (the numbers are called the medium numbers).

The media 331 and spare media 332 are rewritable media. They are also removable media such as DVD-RAMs that may be transported by the transporter 32.

The transporter 32 transports the media 331 or the spare media 332 between the drives 31, cabinet 33, inlet port 34 and outlet port 35.

Figure 2:
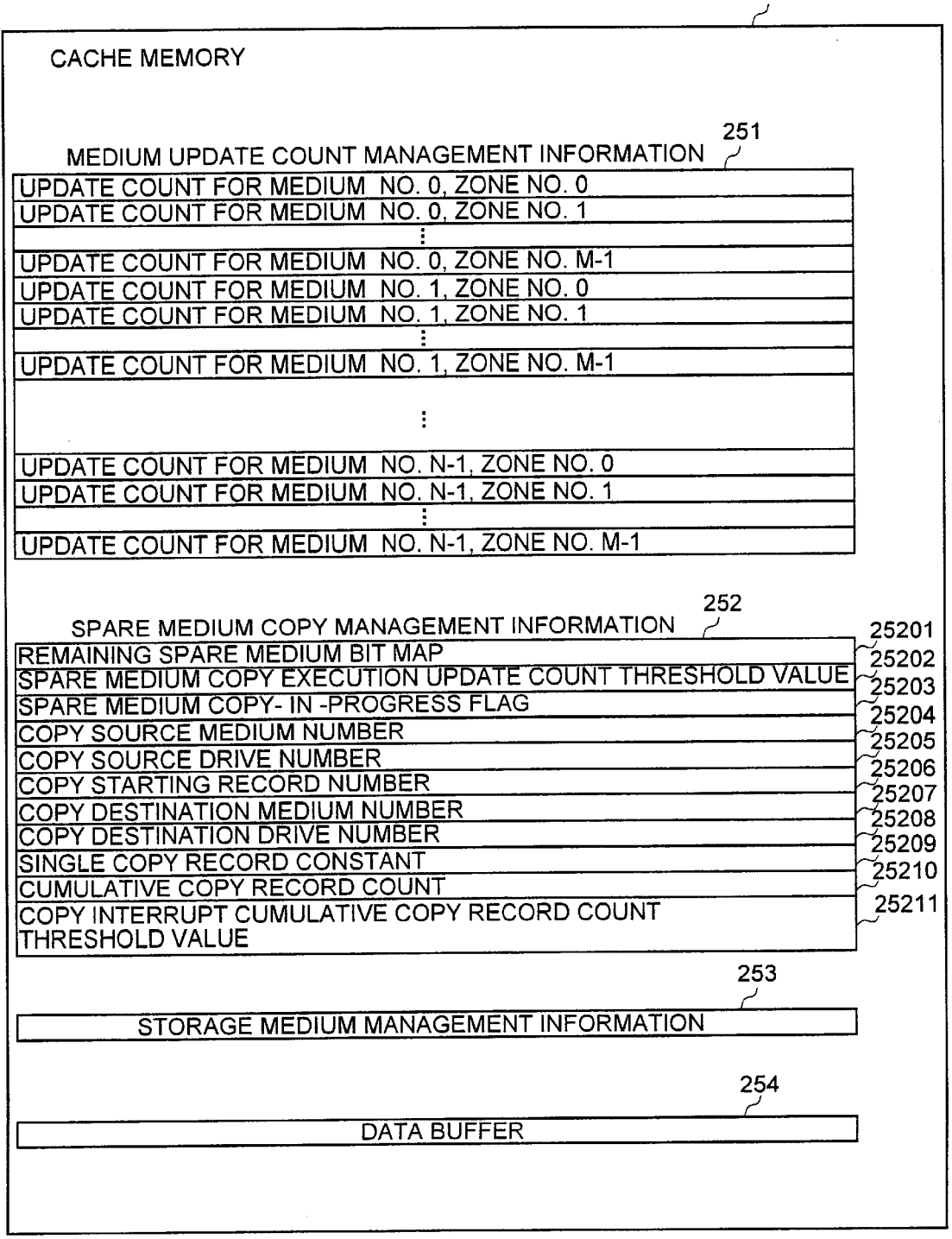
FIG. 2 is a logical tabular diagram showing medium update count management information 251 and spare medium copy management information 252.

FIG. 2 is a logical tabular diagram giving details of the medium update count management information 251 and spare medium copy management information 252 held in the cache memory 25.

The medium update count management information 251 is used to manage the number of times contents of media are updated. It is assumed that the first embodiment has N shelves in the cabinet 33 to accommodate the currently used media 331. Each of the media 331 has its storage area divided into M regions called zones so that an update count is managed for each zone. That is, the medium update count management information 251 retains an update count for each of the zones determined by the medium number (0 through N-1) of the media 331, that is, the number of the shelves of the cabinet 33 accommodating the media 331, and by the zone numbers (0 through M-1) of the media 331. Alternatively, the storage area of media may not be divided into zones. Instead, an update count may be kept up for each of the media in use.

The spare medium copy management information 252 is used to manage copy operations on spare media. As management information, the spare medium copy management information 252 comprises a remaining spare medium bit map 25201, a spare medium copy execution update count threshold value 25202, a spare medium copy-in-progress flag 25203, a copy source medium number 25204, a copy source drive number 25205, a copy starting record number 25206, a copy destination medium number 25207, a copy destination drive number 25208, a single copy record constant 25209, a cumulative copy record count 25210, and a copy interrupt cumulative copy record count threshold value 25211.

The remaining spare medium bit map 25201 denotes the presence or absence of spare media 332 housed in the cabinet 33. The bits constituting the remaining spare medium bit map 25201 correspond to the shelves that accommodate spare media 332. Specifically, a "1" bit in the remaining spare medium bit map 25201 indicates the presence of a spare medium in that shelf of the cabinet 33 which corresponds to the bit in question.

The spare medium copy execution update count threshold value 25202 is compared with each of the update counts in the medium update count management information 251 to determine whether or not to carry out a spare medium copy process 263. If an update count is found to exceed the spare medium copy execution update count threshold value 25202, the spare medium copy process 263 is performed. An appropriate value is selected as the threshold value 25202 depending on a maximum allowable update count of the medium in use, the number of zones on the medium, and other operative conditions.

The spare medium copy-in-progress flag 25203 is a flag that indicates whether the spare medium copy process 263 is in progress. When the flag 25203 is found to be on, it means the spare medium copy process 263 is being carried out; when the flag 25203 is off, it means the process 263 is not in execution.

The copy source medium number 25204 denotes a medium number of a copy source medium 331 for use in the spare medium copy process 263. The copy source drive number 25205 represents a drive number of the drive in which the copy source medium 331 is loaded.

The copy starting record number 25206 is set with a record number of the record from which the spare medium copy process 263 is started.

The copy destination medium number 25207 is a medium number of a copy destination spare medium 332 for use in the spare medium copy process 263. The copy destination drive number 25208 is a drive number of the drive in which the copy destination spare medium 332 is loaded.

The single copy record constant 25209 is a constant that designates the amount of data to be transferred in a single copy operation. The constant is determined illustratively by the size of a buffer used for the copy process.

The cumulative copy record count 25210 represents the number of records copied cumulatively in the spare medium copy process 263. The copy interrupt cumulative copy record count threshold value 25211 is referenced to determine when to interrupt the spare medium copy process 263. Specifically, when the cumulative copy record count 25210 is found to be larger than the copy interrupt cumulative copy record count threshold value 25211 during the spare medium copy process 263, that copy process 263 is interrupted. An appropriate value is selected as the copy interrupt cumulative copy record count threshold value 25211 depending on the system configuration.

The storage medium management information 253 is used to translate a device number, a starting record number and a record count designated by a read/write request from the host computer 1 into a medium number of a medium 331 for the storage system, a medium record number on the medium 331, and a medium record count.

For the first embodiment, it is assumed that any one device visible to the host computer 1 will not store data across a plurality of media 331 in order to have a single medium 331 concurrently subject to the spare medium copy process. If data are to be stored across a plurality of media 331, that means there should be a plurality of media 331 concurrently subject to the spare medium copy process, and it is necessary to select these media 331. In that case, the necessary media 331 may be selected either in ascending (or descending) order of their medium numbers, or in ascending order of their update counts using the medium update count management information 251.

The read process 261, write process 262 and spare medium copy process 263 performed by the processor 26 will now be described.

Figure 3:
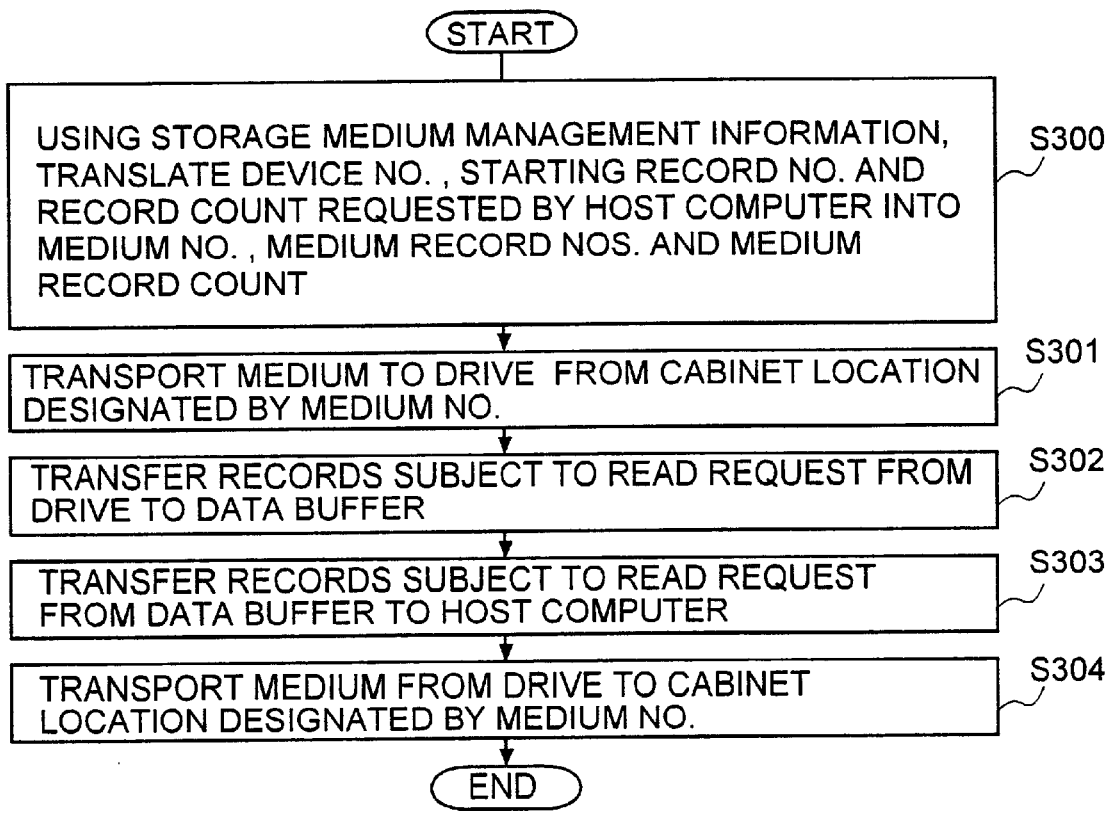
FIG. 3 is a flowchart of steps constituting a read process 261 of the first embodiment.

FIG. 3 is a flowchart of steps constituting the read process 261 carried out by the processor 26. When the read process 261 is started in response to a read request from the host computer 1, the processor 26 uses the storage medium management information 253 to translate a device number, a starting record number and a record count requested by the host computer 1 into a medium number for the medium 331, medium record numbers on the medium 331, and a medium record count (step S300).

The processor 26 then causes the transporter 32 to transport to the drive 31 the medium 331 whose location is identified by the medium number obtained through the translation. The drive 31 into which to load the medium 331 is selected suitably from available drives 31 (step S301). When the medium 331 is loaded into the selected drive 31, the processor 26 reads from the medium 331 the data making up the records that are requested to be read by the host computer 1, and transfers the retrieved data to the data buffer 254 in the cache memory 25 (step S302). The data placed in the data buffer 254 are forwarded to the host computer 1 (step S303). When all necessary data have been transferred, the processor 26 causes the transporter 32 to move the medium 331 from the drive 31 back to its initial location in the cabinet 33 (step S304).

Figure 4:
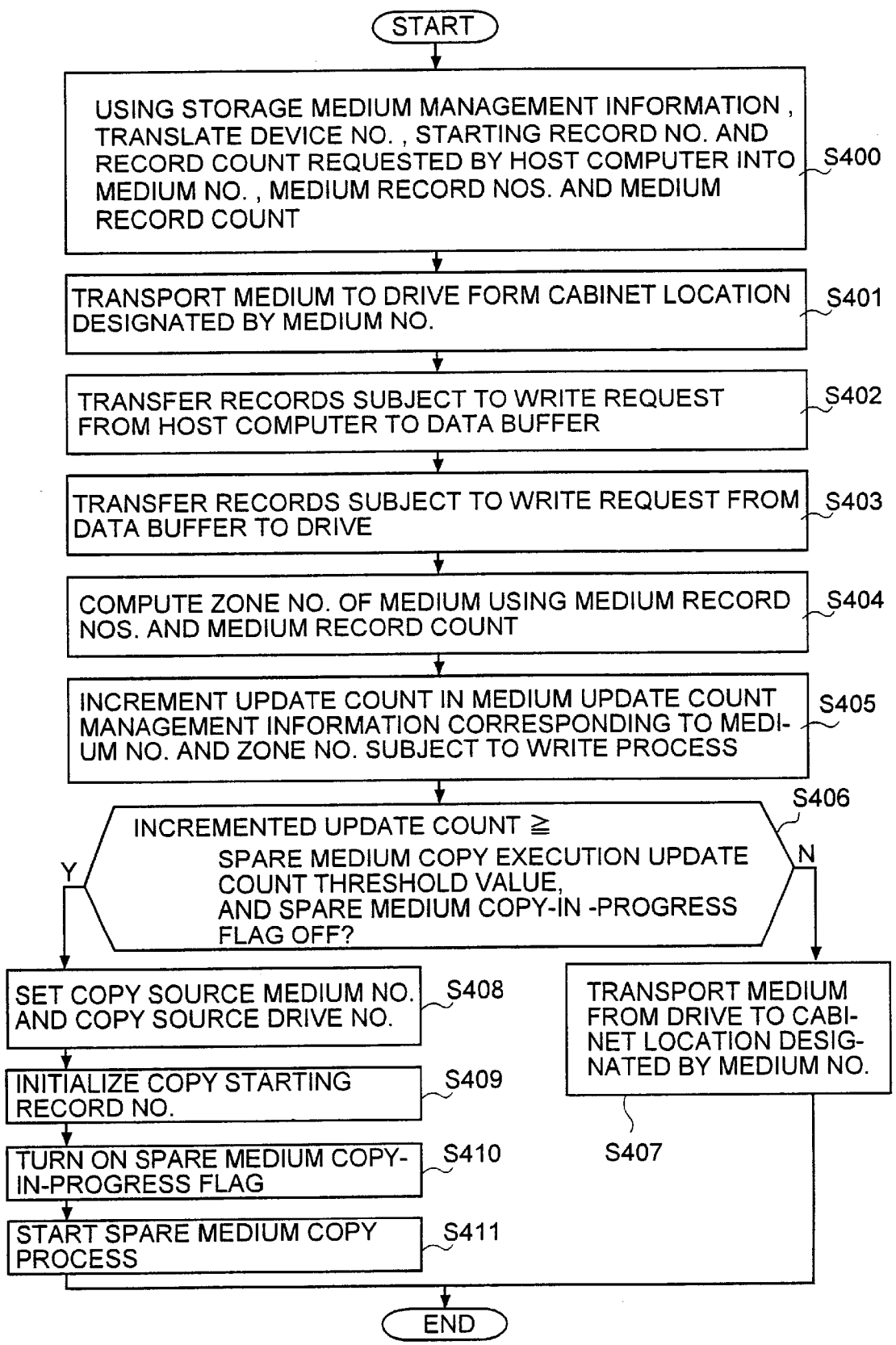
FIG. 4 is a flowchart of steps constituting a write process 262.

FIG. 4 is a flowchart of steps constituting the write process 262 performed by the processor 26. When the write process 262 is started in response to a write request from the host computer 1, the processor 26, as in the case of the read process 261, uses the storage medium management information 253 to translate a device number, a starting record number and a record count requested by the host computer 1 into a medium number, medium record numbers, and a medium record count (step S400).

The processor 26 then causes the transporter 32 to transport to a suitable drive 31 the medium 331 whose location is identified by the medium number obtained through the translation (step S401). When the medium 331 is loaded into the drive 31, the processor 26 transfers the data making up the records requested to be written from the host computer 1 to the data buffer 254 in the cache memory 25 (step S402). The data are forwarded from the data buffer 254 to the drive 31 and written thereby to the medium 331 (step S403). The processor 26 computes a zone number on the medium using the medium record numbers and medium record count (step S404), and increments that update count in the medium update count management information 251 which corresponds to the medium number and zone number (step S405). If the data write area spans a plurality of zones, a plurality of update counts corresponding to these zones are incremented.

A check is then made to see if the number of times the information is incremented (i.e., update count) is at least equal to the spare medium copy execution update count threshold value 25202 and if the spare medium copy-in-progress flag 25203 is turned off (step S406). If the number of times the information is incremented is judged to be less than the spare medium copy execution update count threshold value 25202 or if the spare medium copy-in-progress flag 25203 is found to be on, the processor 26 does not perform the spare medium copy process and causes the medium 331 to be transported from the drive 31 back to its initial location before terminating the write process (step S407).

If the number of times the information is incremented is judged to be at least equal to the spare medium copy execution update count threshold value 25202 and if the spare medium copy-in-progress flag 25203 is found to be off, the processor 26 carries out the spare medium copy process in order to replace the currently used medium with a spare medium. In preparation for the process, the processor 26 sets the medium number of the medium whose update count has reached its threshold value as a result of write processes and the number of the drive 31 in which the medium in question is loaded, respectively, for the copy source medium number 25204 and the copy source drive number 25205 in the spare medium copy management information 252 (step S408). The processor 26 then initializes the copy starting record number 25206 (step S409), turns on the spare medium copy-in-progress flag 25203 (step S410), and starts the spare medium copy process 263 before terminating the write process (step S411).

Figure 5:
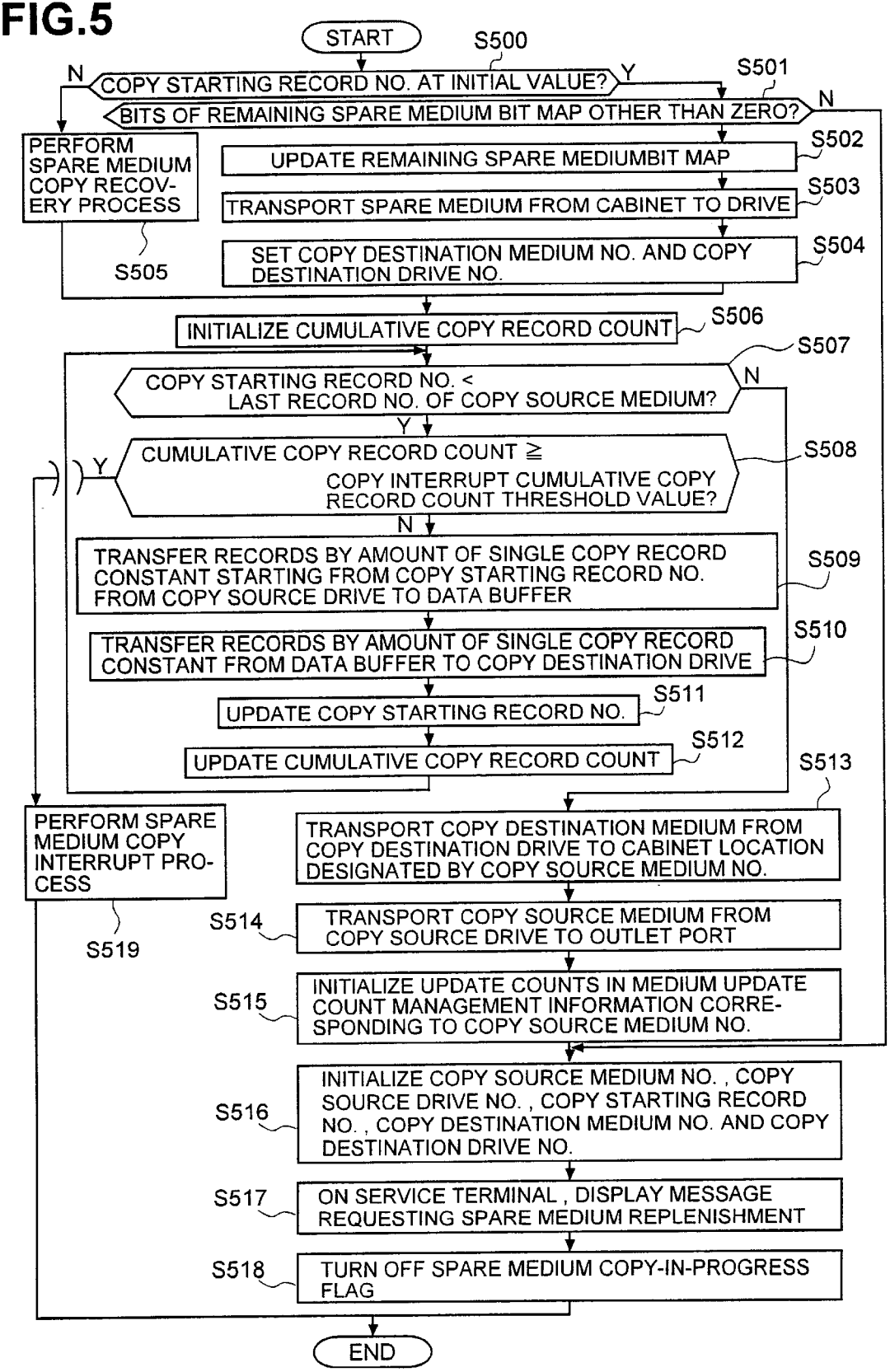
FIG. 5 is a flowchart of steps constituting a spare medium copy process 263.

FIG. 5 is a flowchart of steps constituting the spare medium copy process 263 performed by the processor 26. As described above, the spare medium copy process 263 is started when the update count of a medium has exceeded a threshold value. If interrupted halfway in execution, the spare medium copy process 263 is restarted in properly timed relation with nonexecution of the read process 261 or write process 262 by the storage system, as will be described later.

As shown in FIG. 5, with the spare medium copy process 263 started, a check is made to see if the copy starting record number 25206 is at its initial value, i.e., whether the currently executed spare medium copy process has been started anew or has been resumed after interruption (step S500). If the copy starting record number 25206 is found to be initialized, i.e., if the current spare medium copy process is judged to have been newly started, a check is then made to see if all bits constituting the remaining spare medium bit map 25201 are zeros, i.e., if any spare media 332 exist in the cabinet 33 (step S501). If the remaining spare medium bit map 25201 is found to include nonzero bits indicating the presence of spare media, any one of the "1" bits in the bit map 25201 is selected and updated to "0" (step S502). The processor 26 then causes the transporter 32 to transport to an available drive 31 a spare medium 332 whose location in the cabinet 33 is denoted by the selected bit (step S503). With the spare medium 332 thus transported, the processor 26 sets the medium number of the transported spare medium 332 and the number of the drive in which the spare medium 332 is loaded, respectively, for the copy destination medium number 25207 and the copy destination drive number 25208 in the spare medium copy management information 252 (step S504).

If in step S501 all bits in the remaining spare medium bit map 25201 are zeros indicating the absence of any spare media 332 in the cabinet 33, a spare medium copy process cannot be performed. In that case, the processor 26 initializes (i.e., resets) the copy source medium number 25204, copy source drive number 25205, copy starting record number 25206, copy destination medium number 25207, and copy destination drive number 25208 (step S516). The processor 26 displays on the service terminal 4 a message requesting replenishment of spare media 332 (step S517) by the service engineer 5. Thereafter the processor 26 turns off the spare medium copy-in-progress flag 25203 and terminates the spare medium copy process 263 (step S518).

If in step S500 the copy starting record number 25206 is not at its initial value, that means the spare medium copy process 263 has been resumed after interruption. In that case, the processor 26 carries out a spare medium copy recovery process whose details will be described later (step S505).

After the copy destination medium number 25207 and copy destination drive number 25208 are set in step S504 or after the spare medium copy recovery process is executed in step S505, the processor 26 initializes the cumulative copy record count 25210 (e.g., resets the count to zero). The cumulative copy record count 25210 is used to manage interruptions of the spare medium copy process 263 (step S506).

A check is made to see if the copy starting record number 25206 is smaller than the last record number of the copy source medium, i.e., whether the contents of the medium have been copied up to its last record (step S507). If the copy starting record number 25206 is judged to be smaller than the last record number, with the copy process yet to be complete, a check is made to see if the cumulative copy record count 25210 is at least equal to the copy interrupt cumulative copy record count threshold value 25211 (step S508). If the cumulative copy record count 25210 is found to be at least equal to the copy interrupt cumulative copy record count threshold value 25211, the spare medium copy process 263 is interrupted temporarily so that the processor 26 and drives 31 will not be monopolized by the process 263 for an inordinately long period of time. In that case, the processor 26 terminates the spare medium copy process 263 after carrying out a spare medium copy interrupt process so that the storage system will be eventually returned to it normal operating state. The spare medium copy interrupt process will be described later in more detail (step S519).

If in step S508 the cumulative copy record count 25210 is found to be less than the copy interrupt cumulative copy record count threshold value 25211, the processor 26 effects data transfer from the drive designated by the copy source drive number 25205 to the data buffer 254 in the cache memory 25. The data to be transferred are made up of as many records as designated by the single copy record constant 25209 starting from the record indicated by the copy starting record number 25206 (step S506). From the data buffer 254, the record data are forwarded to the drive designated by the copy destination drive number 25208 for a data write operation (step S510). The processor 26 then increments the copy starting record number 25206 by the value set in the single copy record constant 25209 (step S511) and also increments the cumulative copy record count 25210 by the value set in the single copy record constant 25209 (step S512). Step S512 is followed by step S507, and steps S507 through S512 are repeated to copy data from the copy source drive to the copy destination drive.

If in step S507 the copy starting record number 25206 is judged to be smaller than the last record number of the copy source medium, with the copy process completed up to the last record of the medium subject to copy, the processor 26 causes the transporter 32 to transport the copy destination medium from the drive 31 to that location in the cabinet 33 which is designated by the copy source medium number 25204 (step S513). The copy source medium is transported from the drive 31 to the outlet port 35 (step S514). The processor 26 initializes the update counts of all zone numbers corresponding to the medium designated by the copy source medium number 25204 in the medium update count management information 251 (step S515). Also initialized are the copy source medium number 25204, copy source drive number 25205, copy starting record number 25206, copy destination medium number 25207, and copy destination drive number 25208 (step S516). Thereafter the processor 26 displays on the service terminal 4 a message requesting replenishment of spare media 332 (step S517). Lastly, the processor 26 turns off the spare medium copy-in-progress flag 25203 to terminate the spare medium copy process 263 (step S518).

Figure 6:
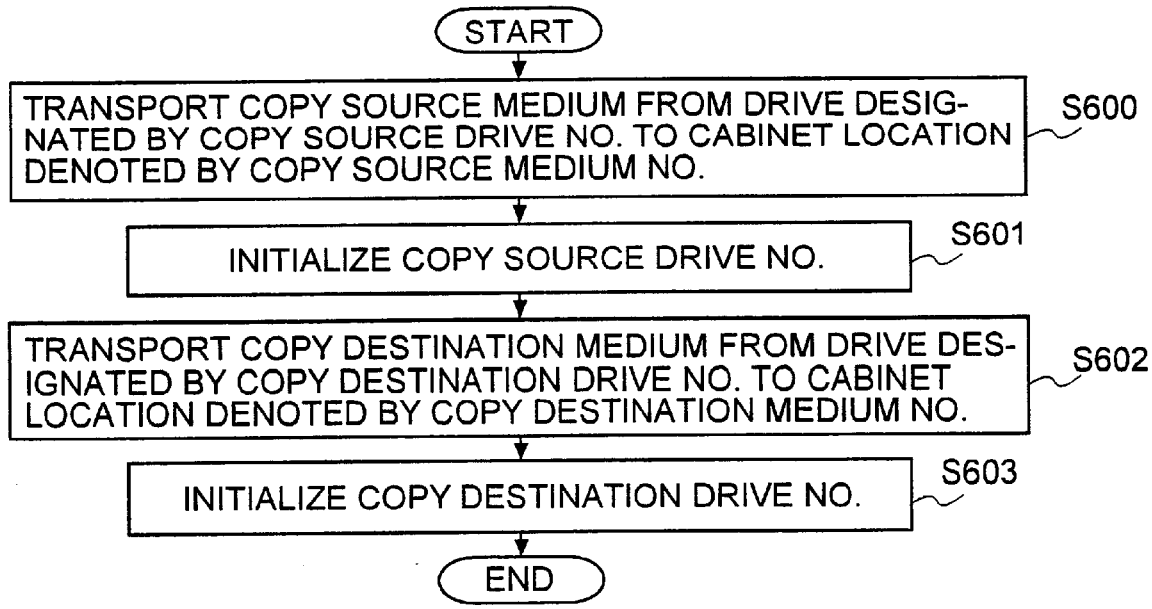
FIG. 6 is a flowchart of steps constituting a spare medium copy interrupt process taking place during the spare medium copy process 263.

FIG. 6 is a flowchart of steps constituting the spare medium copy interrupt process. As described above, when the cumulative copy record count reaches a predetermined threshold value (i.e., copy interrupt cumulative copy record count threshold value 25211) during the spare medium copy process 263, the spare medium copy interrupt process is started to carry out necessary steps to interrupt the copy process. Although the first embodiment has the spare medium copy process interrupted when the cumulative copy record count has exceeded a predetermined value, this is not limitative of the invention. Alternatively, the spare medium copy process may be interrupted by use of a timer.

With the spare medium copy interrupt process started, the copy source medium is first returned to its initial location in the cabinet 33 so as to interrupt the copy process. Referencing the spare medium copy management information 252, the processor 26 causes the transporter 32 to transport the copy source medium from the drive 31 designated by the copy source drive number 25205 to the location in the cabinet 33 denoted by the copy source medium number 25204 (step S600). The processor 26 then initializes (i.e., resets) the copy source drive number 25205 (step S601). Likewise, upon referencing the spare medium copy management information 252, the processor 26 causes the transporter 32 to transport the copy destination medium from the drive 31 designated by the copy destination drive number 25208 to the location in the cabinet 33 indicated by the copy destination medium number 25207 (step S602). Thereafter the processor 26 initializes (i.e., resets) the copy destination drive number 25208 (step S603).

Figure 7:
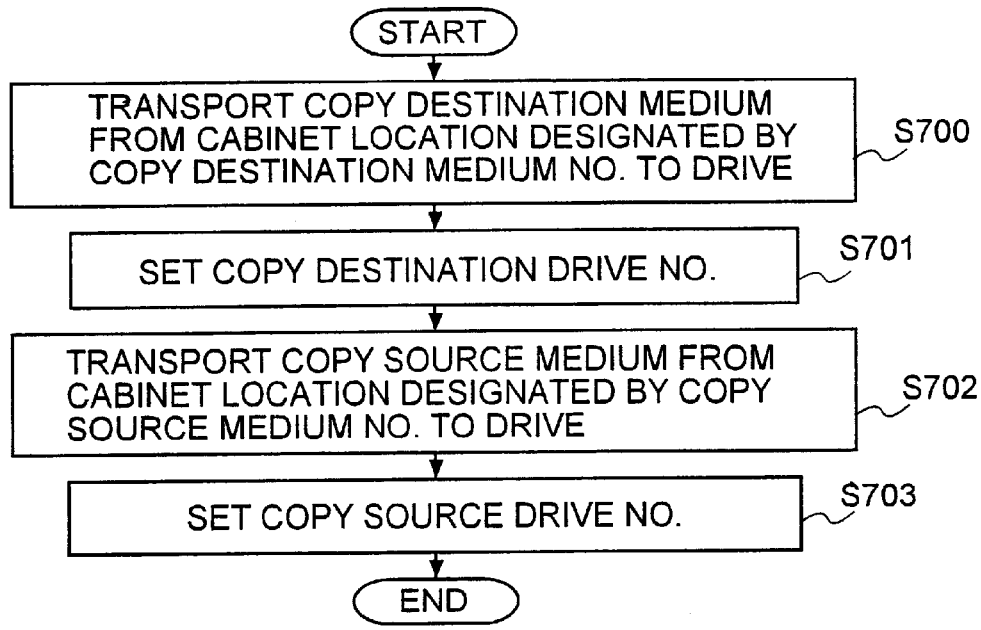
FIG. 7 is a flowchart of steps constituting a spare medium copy recovery process taking place during the spare medium copy process 263.

FIG. 7 is a flowchart of steps constituting the spare medium copy recovery process. As described above, when an interrupted spare medium copy process is resumed, the spare medium copy recovery process is started so as to recover the status in effect when the process was most recently interrupted.

Referencing the copy destination medium number 25207 in the spare medium copy management information 252, the processor 26 first causes the transporter 32 to transport the copy destination medium from the location in the cabinet 33 designated by the copy destination medium number 25207 to an appropriate drive 31 (step S700). The processor 26 then sets the number of the drive 31 in which the copy destination medium is loaded for the copy destination drive number 25208 (step S701). Likewise, upon referencing the copy source medium number 25204 in the spare medium copy management information 252, the processor 26 causes the copy source medium to be transported from the location in the cabinet 33 designated by the copy source medium number 25204 to a suitable drive 31 (step S702). The number of the drive 31 in which the copy source medium is loaded is set for the copy source drive number 25205 (step S703).

If it is possible to prepare a drive that may be monopolized by the copy destination medium while the spare medium copy process 263 is being executed, there is no need for the copy destination medium to be transported during the spare medium copy interrupt process or spare medium copy recovery process.

Described below is what takes place after execution of the spare medium copy process 263 and until a new spare medium is loaded. Recognizing the message on the service terminal 4 requesting replenishment of a spare medium, the service engineer 5 collects the ejected copy source medium from the outlet port 35 and places a new spare medium 332 in the inlet port 34 for spare medium replenishment. After placement of the new spare medium 332, the service engineer 5 operates the service terminal 4 to inform the storage controller 2 that the spare medium 332 has now been placed in the inlet port 34. Notified of the completion of placement of the spare medium 332 in the inlet port 34, the storage controller 2 causes the processor 26 to carry out the spare medium loading process 264.

Figure 8:
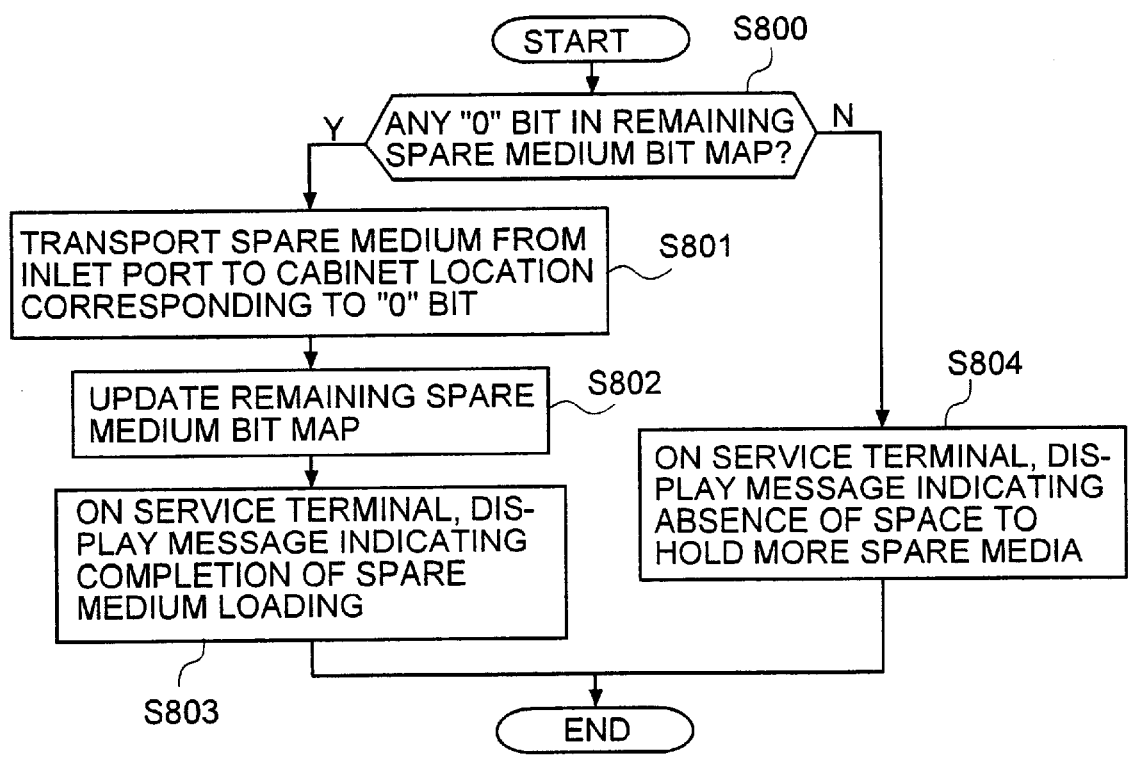
FIG. 8 is a flowchart of steps constituting a spare medium loading process 264.

FIG. 8 is a flowchart of steps constituting the spare medium loading process 264. With the spare medium loading process 264 started, a check is first made to see if the remaining spare medium bit map 25201 contains any "0" bit, i.e, whether the cabinet 33 has any location to accommodate a new spare medium 332 (step S800). If the remaining spare medium bit map 25201 includes "0" bits indicating the availability of locations for holding the new spare medium 332, the processor 26 selects one of the "0" bits in the bit map 25201. The processor 26 then causes the transporter 32 to transport the spare medium 332 from the inlet port 34 to that location in the cabinet 33 which corresponds to the selected bit (step S801). The processor 26 then sets to "1" that bit in the remaining spare medium bit map 25201 which was selected in step S801 (step S802). Thereafter the processor 26 displays on the service terminal 4 a message indicating the completion of loading of the spare medium and terminates the spare medium loading process 264 (step S803).

If in step S800 the remaining spare medium bit map 25201 is judged to have no "0" bit, which means the unavailability of locations for accommodating any new spare medium 332, the processor 26 displays on the service terminal 4 a message indicating the absence of space to hold further spare media, and terminates the spare medium loading process 264 (step S804).

For the above-described first embodiment, the service terminal 4 is provided independently. Alternatively, an independent service terminal may be eliminated and the host computer 1 may instead be equipped to display messages including one requesting replenishment of a spare media 332. The host computer 1 may also be equipped to start the spare medium loading process 264.

Figure 9:
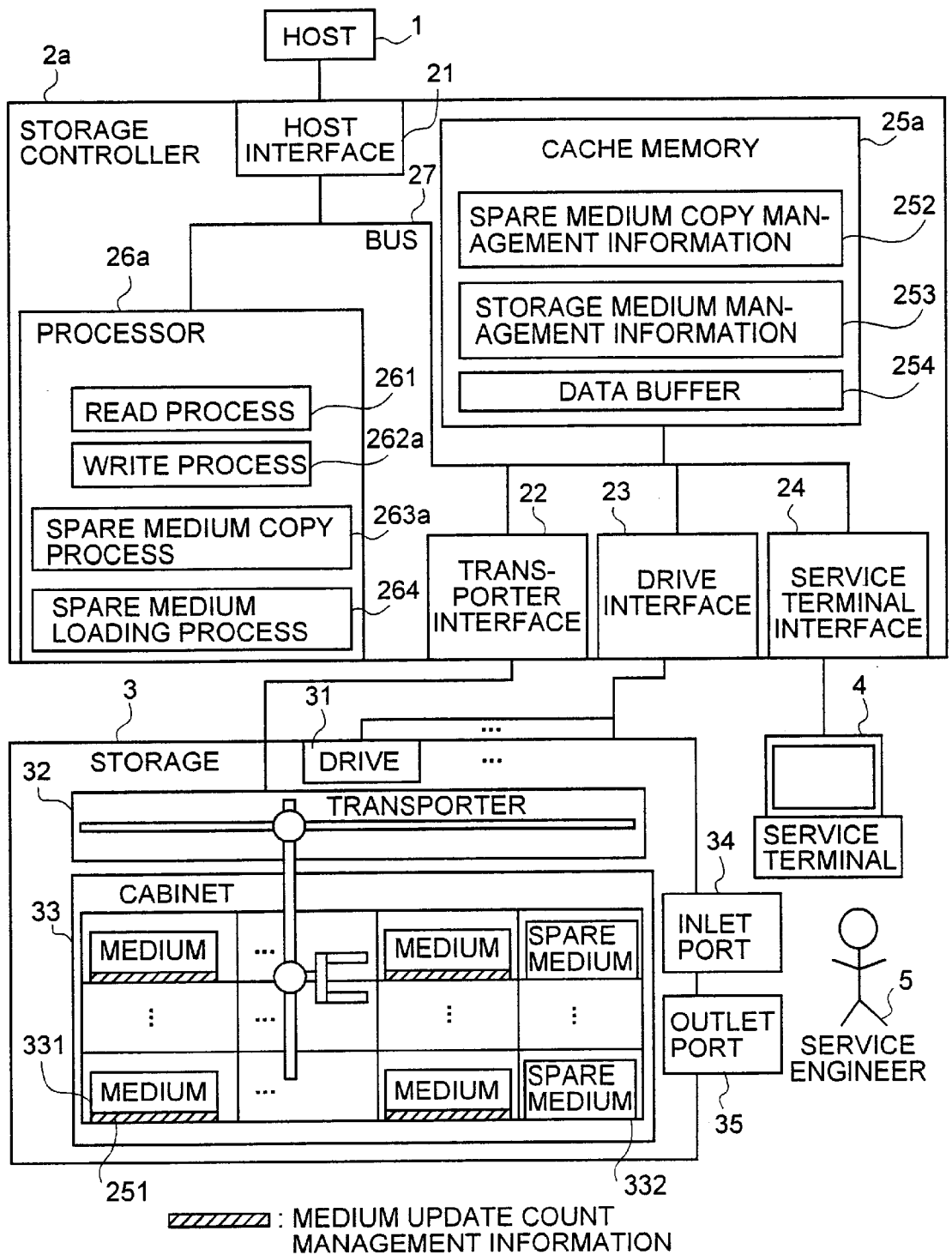
FIG. 9 is a block diagram of a storage system practiced as a second embodiment of this invention.

FIG. 9 is a block diagram of a storage system practiced as the second embodiment of this invention. In FIG. 9, the components or processes with their functionally identical or equivalent counterparts already shown in FIG. 1 are designated by like reference numerals.

The storage system as the second embodiment differs from the first embodiment in that the medium update count management information 251 held in the cache memory 25 of the first embodiment is retained by individual media 331 with the second embodiment. Specifically, the medium update count management information 251 is placed in a particular region of each medium 331. The information 251 holds update counts of the zones (zone numbers 0 through M−1) on the medium in question. One way of keeping the update counts of all zones is by storing them in a limited region on the medium together with information representing the individual zones. Another way of maintaining the update counts is by utilizing the starting record of each of the zones involved; the update count of each zone is to be held in its starting record.

There is no need to store medium update management information in the cache memory 25a. The cache memory 25a inside the storage controller 2a thus remans unaffected by the number of media 331 held in the storage 3. That means the cache memory 25a may be reduced in capacity. It becomes necessary to reference or update the medium update count management information 251 on a given medium 331 only if the medium 331 is loaded in the drive 31. For that reason, there is no increase in the amount of operations for transporting a medium 331 regardless of the medium update count management information 251 being held on that medium 331.

Figure 10:
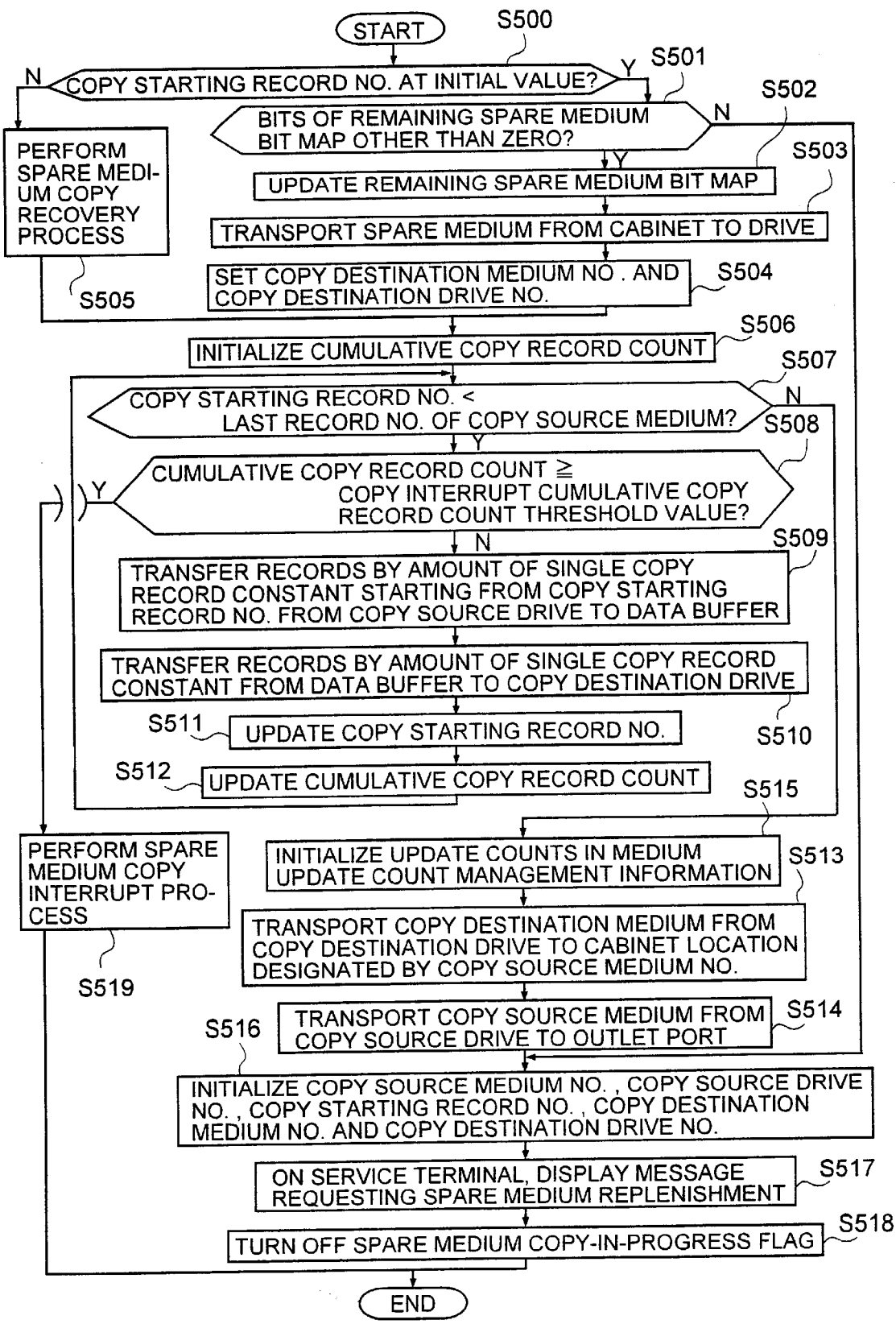
FIG. 10 is a flowchart of steps constituting a spare medium copy process 263a of the second embodiment.

Given the modifications described above, the processor 26a of the second embodiment performs a write process 262a in which the medium update count management information that was subject to reference and update in step S405 in the write process of FIG. 4 is now retained on the medium 331. In a spare medium copy process 263a, the medium update count management information that was initialized in step S515 is retained on a copy destination spare medium 332 with the second embodiment. Step S515 is carried out before step S513 because the medium update count management information needs to be initialized while the spare medium 332 is being loaded in the drive 31. FIG. 10 is a flowchart of steps constituting the spare medium copy process 263a in which these modifications are reflected.

The other specifics of the storage system practiced as the second embodiment are the same as those of the first embodiment, and their detailed descriptions are omitted.

Figure 11:
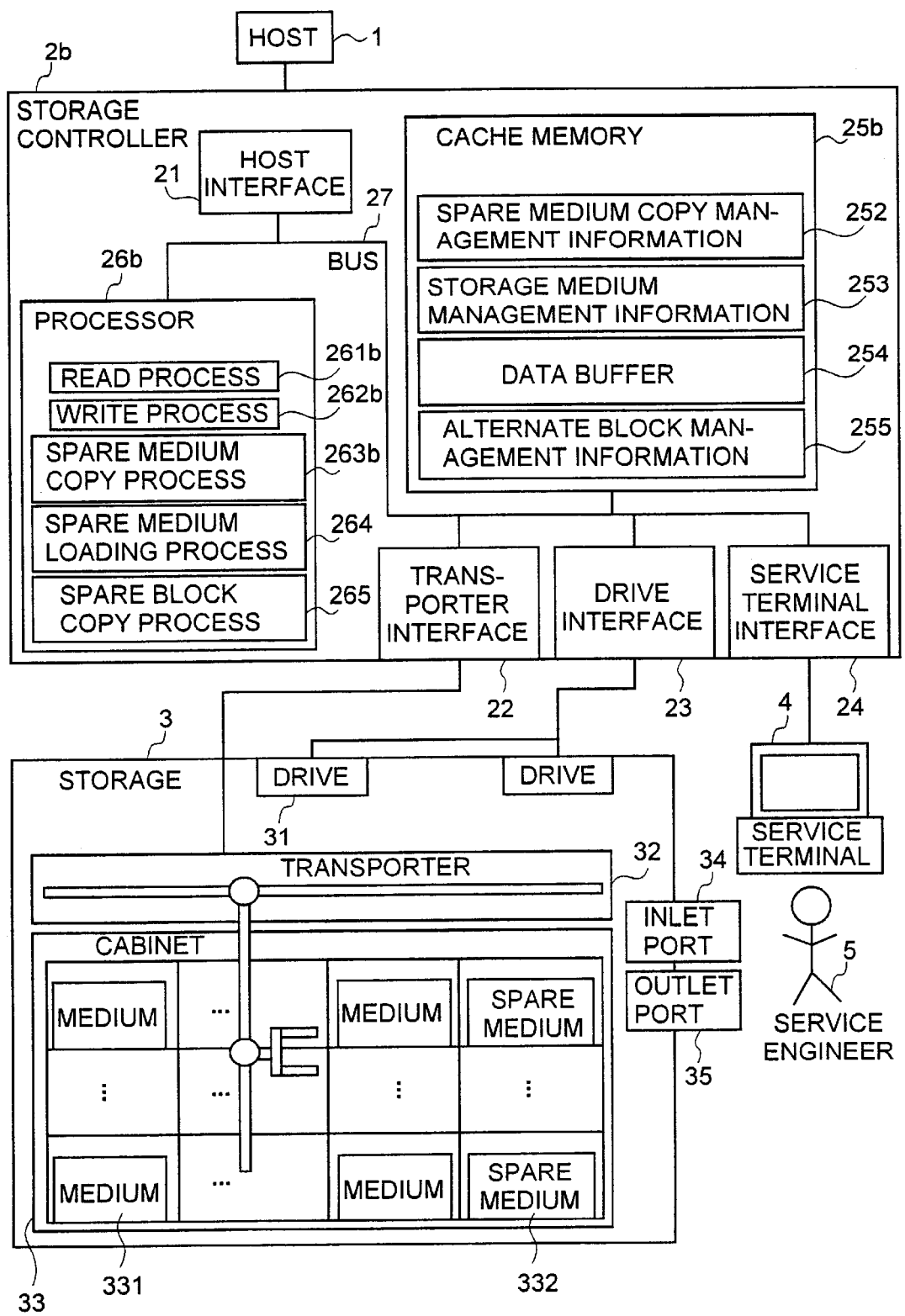
FIG. 11 is a block diagram of a storage system practiced as a third embodiment of this invention.

FIG. 11 is a block diagram of a storage system practiced as the third embodiment of this invention. The storage system as the third embodiment differs from the first and the second embodiment in that, without the use of medium update count management information 255, a spare medium copy process is started when the spare zones on a medium 331 have been exhausted. The third embodiment is described below with emphasis on what makes it significantly different from the first and the second embodiment.

The cache memory 25b in the storage controller 2b retains alternate block management information 255 in place of the medium update count management information used by the first embodiment. A memory in the processor 26b holds programs for executing a spare block copy process 265. A read process 261b, a write process 262b and a spare medium copy process 263b are partially different, respectively, from the read process 261, write process 262 and spare medium copy process 263 of the first embodiment. The differences will be described later in more detail. The other specifics of the storage controller 2b of the third embodiment are the same as those of the first embodiment.

Figure 12:
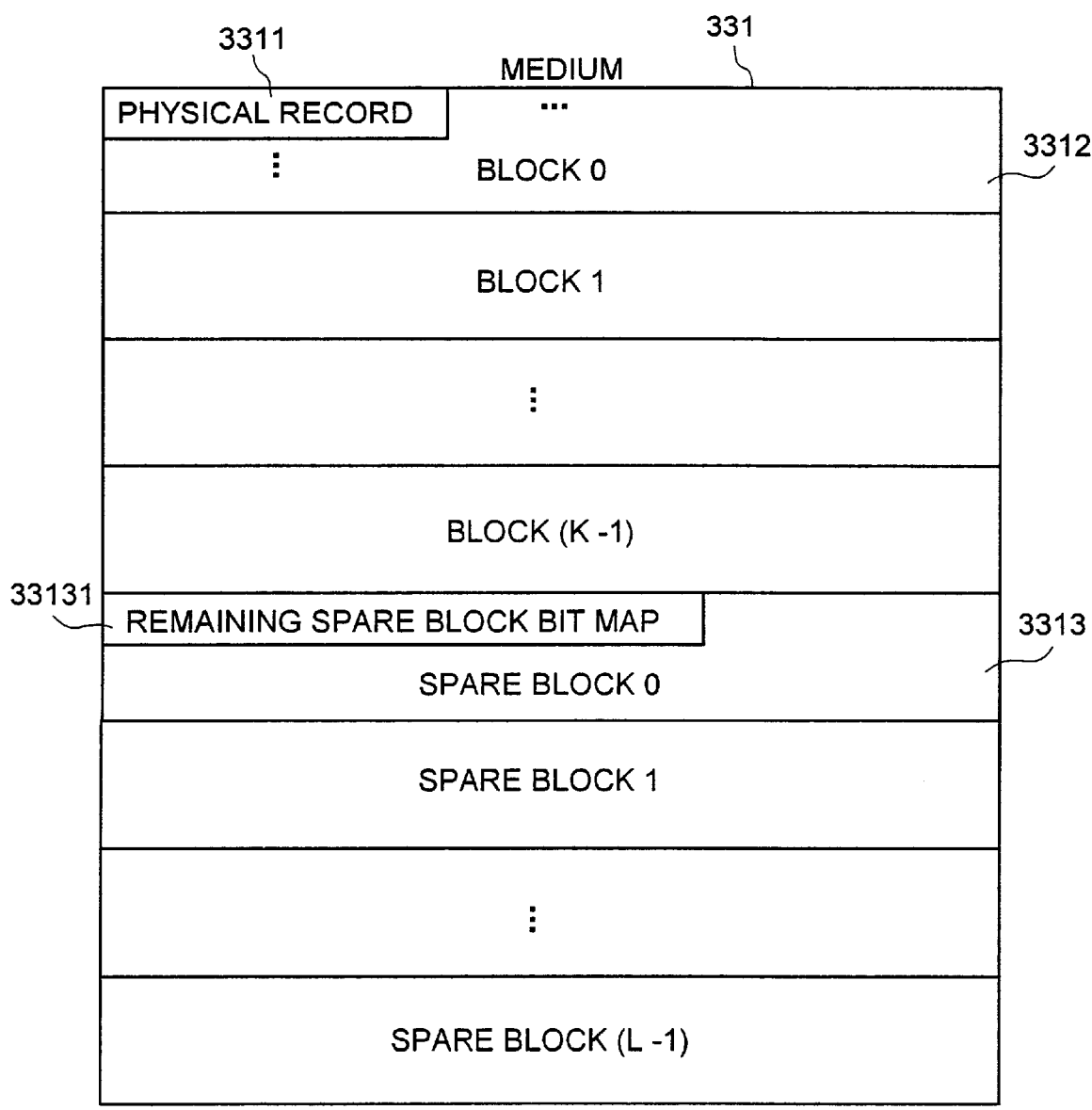
FIG. 12 is a conceptual view depicting an internal structure of a medium for use with the third embodiment.

FIG. 12 is a conceptual view depicting a structure of a storage area on a medium 331 for use with the third embodiment. The storage area on the medium 331 is made up of a plurality of physical records 3311 that serve as units in which to reference or update data. A plurality of physical records 3311 constitute a single block. The medium 331 has a plurality of blocks thereon. Some of these blocks are set aside as spare blocks in advance. In the description that follows, ordinary blocks in which to store data are simply called blocks 3312 as opposed to spare blocks 3313.

Part of a spare block 3313 contains a remaining spare block bit map 33131 indicating status of the remaining spare blocks. If the remaining spare block bit map 33131 has a "1" bit, that means the corresponding spare block 3313 is free and available. A "0" bit in the bit map indicates that the corresponding spare block 3313 is already used.

Figure 13:
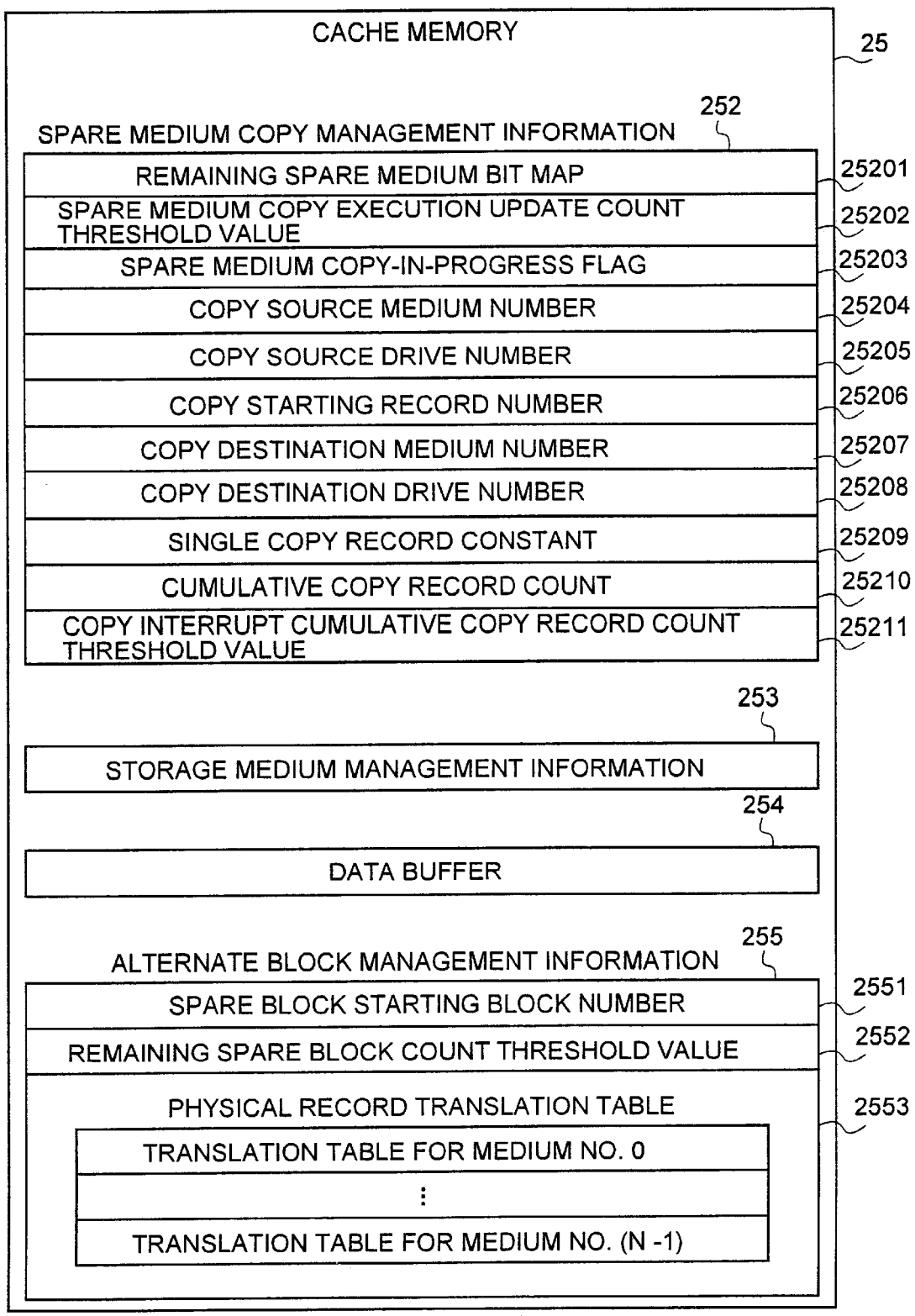
FIG. 13 is a logical tabular diagram showing spare medium copy management information 252 and alternate block management information 255 for use with the third embodiment.

FIG. 13 is a logical tabular diagram showing details of information held in a cache memory 25b of the third embodiment. With the third embodiment, alternate block management information 255 is provided anew in the cache memory 25b. The alternate block management information 255 comprises a spare block starting block number 2551, a remaining spare block count threshold value 2552, and a physical record translation table 2553. The spare block starting block number 2551 indicates the starting spare block 3313; the remaining spare block count threshold value 2552 stands for a minimum remaining spare block count referenced so as to determine when to start the spare medium copy process 263; and the physical record translation table 2553 is used to translate medium record numbers converted with reference to the storage medium management information 253 into numbers representing physical records 3311 (i.e., actual record numbers).

The spare block starting block number 2551 denotes the first spare block 3313 in the storage area on the medium 331. With the third embodiment, the above-mentioned remaining spare block bit map 33131 is held in the block designated by the spare block starting block number 2551. The bits in the remaining spare block bit map 3313 correspond on a one-for-one basis to the spare blocks ranging from the block next to the starting block indicated by the spare block starting block number 2551, to the last block. In an initial state, the physical records 3311 are assigned to the medium records in such a manner that the record numbers match. Since part of the physical records 3311 are included in the spare blocks 3313, the number of medium records is smaller than the number of physical records. For each medium, the physical record translation table 2553 is constituted by a plurality of tables having information for assigning the medium records to their physical records, i.e., to their actual record numbers.

Figure 14:
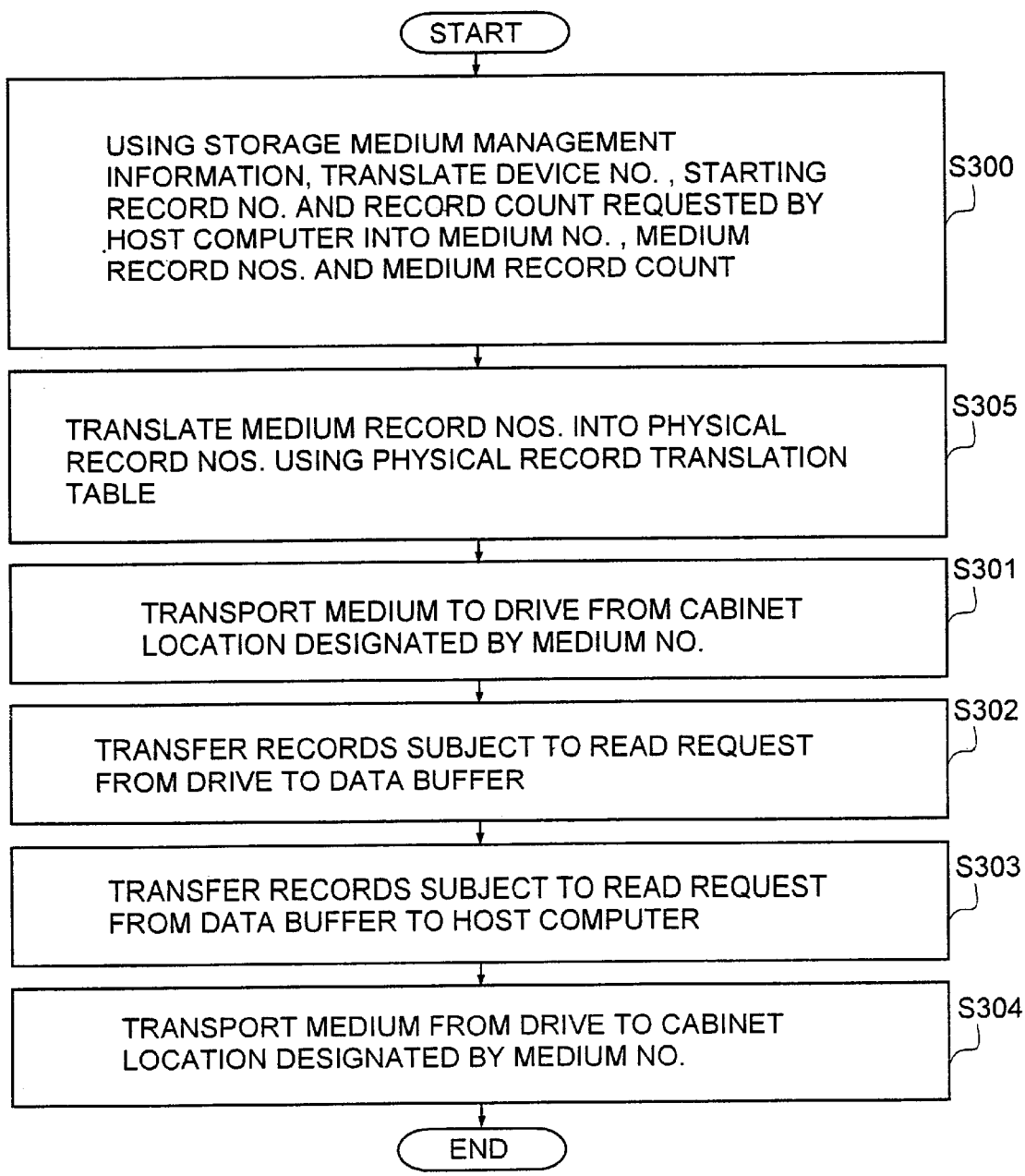
FIG. 14 is a flowchart of steps constituting a read process 261b of the third embodiment.

FIG. 14 is a flowchart of steps constituting a read process 261b of the third embodiment. A read process 261b of the third embodiment is basically the same as the read process 261 of the first embodiment in FIG. 3. What makes the read process 261b different from the process 261 is that step S300 is followed by step S305 in order to access data in the records requested by the host computer 1. In step S305, the processor 26b translates medium record numbers converted with reference to the storage medium management information 253 into record numbers of physical records 3311 in accordance with the physical record translation table 2553. In step S302, the medium is accessed by use of the physical record numbers obtained in step S305 in place of the medium record numbers acquired in step S300. The other steps are the same as those in the read process 261; these steps are designated by like reference numerals used in FIG. 3. Descriptions of these steps are omitted below since they have already been discussed in connection with the first embodiment.

Figure 15:
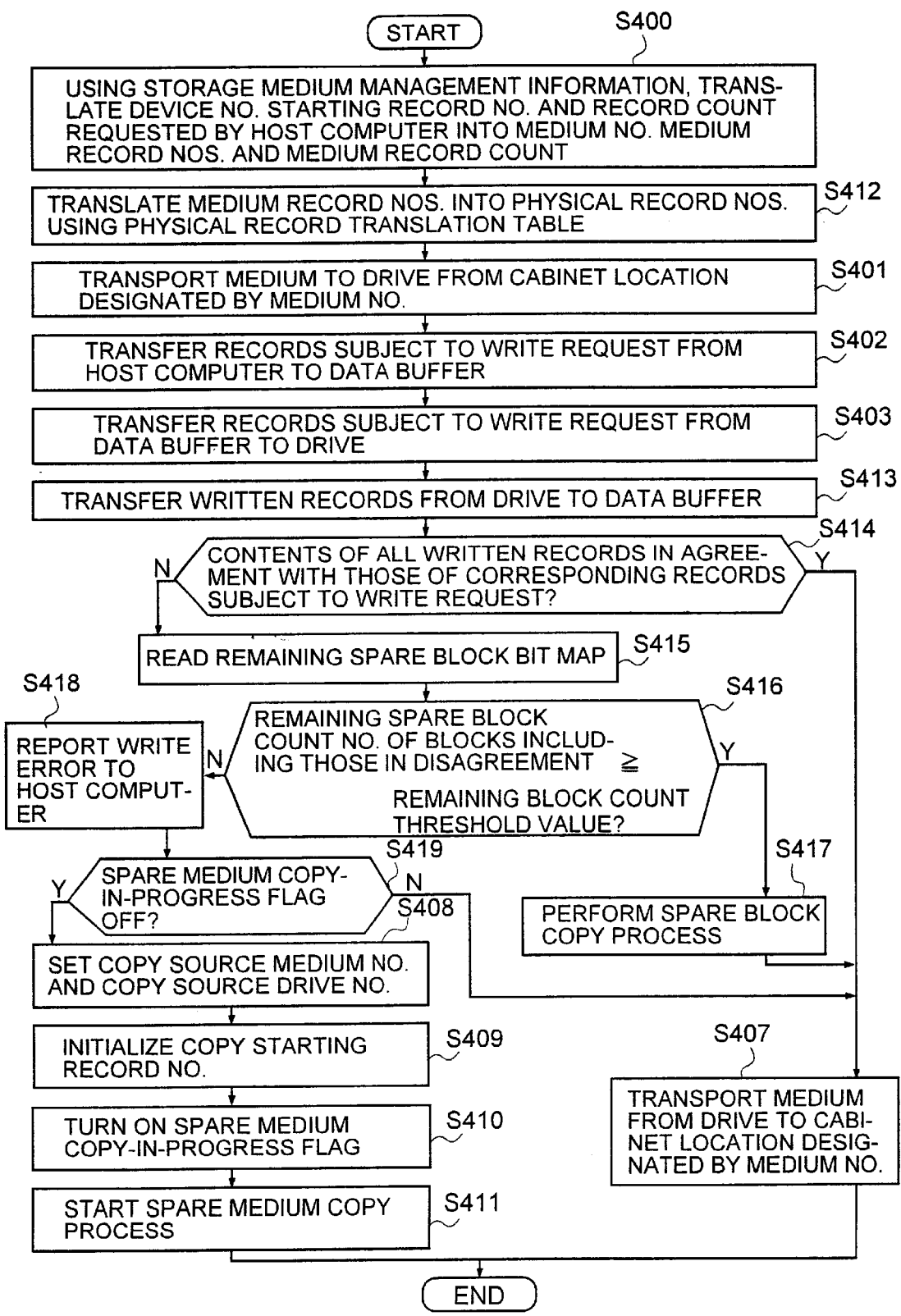
FIG. 15 is a flowchart of steps constituting a write process 262b of the third embodiment.

FIG. 15 is a flowchart of steps constituting a write process 262b of the third embodiment. In FIG. 15, the same steps as those in the write process 262 are given like reference numerals used in FIG. 4, and detailed descriptions of these steps are omitted below. What follows is a description of steps that make the write process 262b different from the process of FIG. 4.

As in the read process 261b, the medium record numbers obtained in step S400 of the write process 262b are translated into record numbers of physical records 3311 in accordance with the physical record translation table 2553 (step S412). Then in steps S401 through S403, the processor 26b writes data transferred from the host computer to the records on the medium. In step S403, the physical record numbers acquired in step S412 are used instead of the medium record numbers obtained in step S400.

After writing the data to the medium 331 in step S403, the processor 26b reads the data from the records thus written and transfers the retrieved data to the data buffer 254. In this case, the processor 26b allocates a new region as the data buffer 254 that is different from the region used in step S402; the processor 26 transfers the data read from the medium 331 to the newly allocated region (step S413). The data transferred from the host computer 1 to the data buffer 254 in step S402 are compared with the data retrieved from the medium 331 and transferred to the data buffer 254 in step S413 in units of records (step S414). If the comparison shows that all records match in terms of contents, step S407 is reached. In step S407, the medium 331 is transported and the process is terminated.

If the comparison in step S414 reveals a mismatch of contents between records, the processor 26b reads into the data buffer 254 the remaining spare block bit map 33131 retained in the block designated by the spare block starting number 2551 in the alternate block management information 255 (step S415). The processor 26b then counts "1" bits in the remaining spare block bit map 33131 to find the number of unused spare blocks on the medium 331. The processor 26b further obtains the difference between the number of remaining spare blocks acquired above and the number of blocks containing records whose contents were found to be in disagreement (i.e., remaining spare block count minus the number of blocks containing mismatch records). The processor 26b compares the obtained difference in block count with the remaining spare block count threshold value 2552 (step S416).

If in step S416 the difference between the number of remaining spare blocks and the number of blocks containing records whose contents do not match is judged to be at least equal to the remaining spare block count threshold value 2532, then the spare block copy process 265 is carried out (step S417), followed by step S407.

If in step S416 the difference between the number of remaining spare blocks and the number of blocks containing records whose contents disagree is judged to be less than the remaining spare block count threshold value 2532, that means it is impossible to set aside spare blocks to which to write all data requested to be written. In that case, the processor 26b considers the write process to have failed and sends a write request error report to the host computer 1 (step S418). Thereafter a check is made to see if the spare medium copy-in-progress flag 25203 is turned off (step S419). If the flag 25203 is judged to be off, the processor 26b goes to step S408 and on to subsequent steps wherein the process of data copy to a spare medium is performed.

If in step S419 the spare medium copy-in-progress flag 25203 is judged to be on (step S419), the processor 26b reaches step S407. Given the write request error report, the host computer 1 retries the write request upon elapse of a predetermined period of time during which the currently executed process of data copy to the spare medium is expected to be completed.

Figure 16:
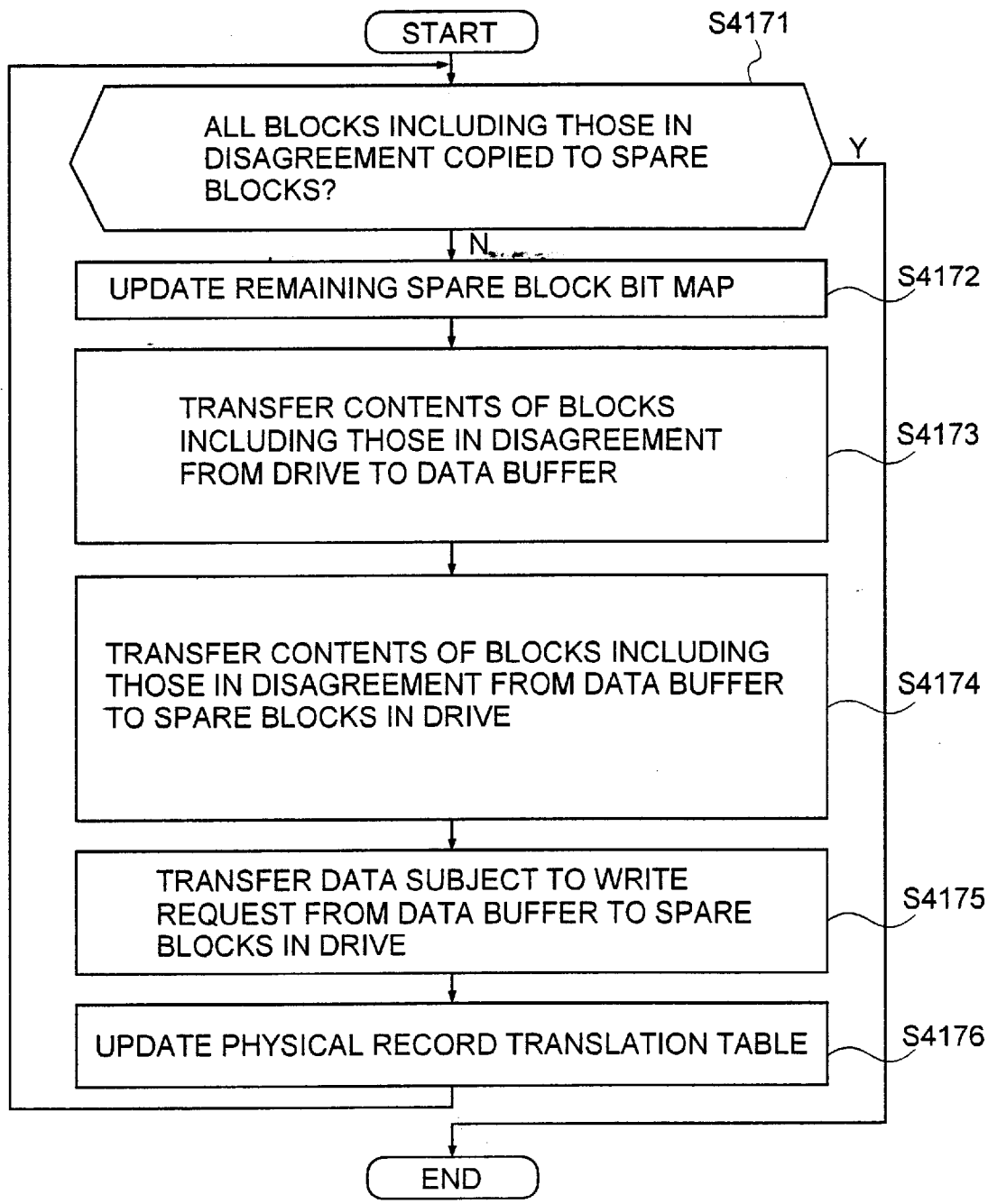
FIG. 16 is a flowchart of steps constituting a spare block copy process 265 of the third embodiment.

FIG. 16 is a flowchart of steps constituting a spare block copy process 265 of the third embodiment. The processor 26b first checks to see if all blocks including those whose contents do not match have been copied to spare blocks 3313 (step S4171). If all blocks including those whose contents disagree are judged to have been copied to the spare blocks 3313, the processor 26b terminates the spare block copy process 265 and goes to step S407 for the write process 262b.

If it is found in step S4172 that any of the blocks including those whose contents do not match have yet to be copied to the spare blocks 3313, the processor 26b selects some of the "1" bits in the remaining spare block bit map 33131 and sets the selected bits to zeros (step S4172). The processor 26b then transfers the data of the blocks yet to be copied from the medium 331 to the data buffer 254 (step S4173), and writes the data from the data buffer 254 to the spare blocks corresponding to those bits in the remaining spare block bit map 33131 which were selected in step S4172 (step S4174). The processor 26b proceeds to write the data requested by the host computer 1 to be written to records in the relevant blocks, to the corresponding records in the blocks to which the data were written in step S4174 (step S4175). Thereafter the processor 26b updates the contents of the physical record translation table 2553 in such a manner that the medium record numbers keyed to physical records in the blocks copied to spare blocks will correspond to physical records in spare blocks on the copy destination medium (step S4176). Step S4176 is followed by step S4171 from which the above-described steps are repeated on all blocks including those whose contents are judged to be in disagreement.

Figure 17:
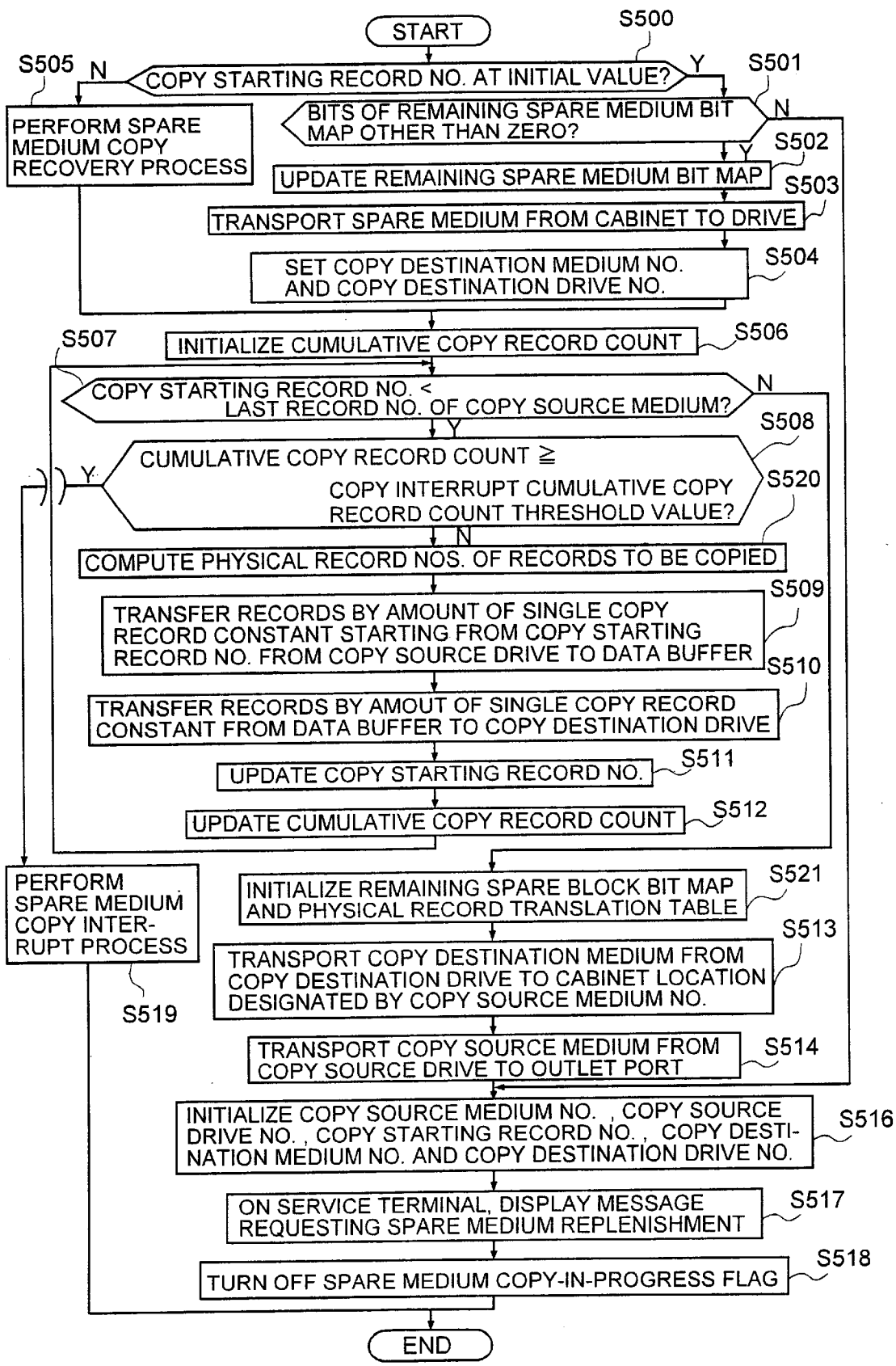
FIG. 17 is a flowchart of steps constituting a spare medium copy process 263b of the third embodiment.

FIG. 17 is a flowchart of steps constituting a spare medium copy process 263b of the third embodiment. In FIG. 17, the same steps as those in the spare medium copy process 263 are given like reference numerals used in FIG. 5, and detailed descriptions of these steps are omitted below. What follows is a description of steps that make the spare medium copy process 263b different from the process of FIG. 5.

In step S508 of the spare medium copy process 263b, a check is made to see if the number of copied records has reached a predetermined threshold value. If the number of copied records is judged to be less than the threshold value, that means the spare medium copy process is allowed to continue. In that case, before transferring data from a copy source medium to a copy destination medium, the processor 26b obtains physical record numbers of the records to be copied. Specifically, with reference to the physical record translation table 2553, the processor 26b translates the medium record numbers of the records retaining the data to be copied, into physical record numbers of the records actually holding data on the medium (step S520).

With all data copied from the copy source medium to the copy destination medium, the processor 26b initializes the remaining spare block bit map 33131 on the spare medium 332 as well as those portions in the physical record translation table 2553 which relate to the medium subjected to the copy process (step S521), before transporting the medium into the cabinet in step S513.

As described and according to the invention, the storage system for use with removable storage media each subject to a maximum allowable update count may have such media replaced automatically, i.e., without operator intervention.

The inventive system need not be halted in operation to let the storage media be replaced or to have spare media replenished. It is thus possible for the invention to be implemented in the form of a storage system offering an enhanced availability.

As many apparently different embodiments of this invention may be made without departing from the spirit and scope thereof, it is to be understood that the invention is not limited to the specific embodiments thereof except as defined in the appended claims.

What is claimed is:

1. A storage system comprising:
   a cabinet for accommodating a plurality of rewritable removable media;
   reading and writing means for performing read and write operations on said removable media;
   a transporter for transporting said removable media between said cabinet and said reading and writing means; and
   a controller for controlling said reading and writing means and said transporter;
   wherein said controller manages an update count for each removable medium being used and, if said update count is found to exceed a predetermined threshold value for a first removable medium, copies contents of said first removable medium to a second removable medium so that after the copying, said second removable medium is used in place of said first removable medium.

2. A storage system according to claim 1, wherein said controller manages use status of spare regions in each removable medium being used;
   wherein, if an attempt to update regions of a removable medium being used fails, said controller updates the use status of said spare regions of the removable medium in question while copying contents of the regions of which the update failed to said spare regions;
   wherein said controller uses the newly copied spare regions in place of the failed regions; and
   wherein, if an available size of said spare regions is found to be less than a predetermined threshold value for said first removable medium, said controller copies contents of said first removable medium to said second removable medium.

3. A storage system according to claim 1, further comprising an ejecting element for ejecting said removable media, wherein said controller causes said transporter to transport to said ejecting element said first removable medium of which the contents have been copied to said second removable medium.

4. A storage system comprising:
   a controller;
   a cabinet for accommodating a plurality of rewritable removable media;
   at least two drives for performing read and write operations on said removable media; and
   a transporter for transporting said removable media between said cabinet and said drives;
   wherein, in response to a write request from a host computer, said controller causes said transporter to transport a first removable medium to which to write data from said cabinet to a first drive;
   wherein, every time a data write operation is performed on said first removable medium, said controller updates update count management information by which to manage an update count for each of said removable media;
   wherein, when the update count for said first removable medium is found to have exceeded a predetermined threshold value, said controller causes said transporter to transport a spare second removable medium from said cabinet to a second drive; and
   wherein said controller copies data held on said first removable medium to said second removable medium before causing said controller to transport said second removable medium to said cabinet for storage therein in place of said first removable medium.

5. A storage system according to claim 4, wherein each of said removable media is written with said update count management information by which to manage the update count for each of said removable media.

6. A storage system according to claim 4, further comprising an ejecting element for ejecting said removable media, wherein said controller causes said transporter to transport to said ejecting element said first removable medium of which the contents have been copied to said second removable medium.

7. A storage system according to claim 4, further comprising a loading element for loading removable media from outside, wherein said controller causes said transporter to transport a removable medium placed in said loading element to said cabinet for storage therein as a spare removable medium.

8. A controlling method for use with a storage system having a plurality of rewritable removable media, comprising the steps of:
   managing an update count for each removable medium being used;
   if said update count is found to exceed a predetermined threshold value for a first removable medium, copying contents of said first removable medium to a second removable medium; and
   using said second removable medium in place of said first removable medium after the copying.

9. A controlling method according to claim 8, further comprising the steps of:
   in response to a write request from a host computer, writing data to said first removable medium;
   if an attempt to update regions of said first removable medium fails, updating use status of spare regions of said first removable medium while copying contents of the regions of which the update failed to said spare regions of said first removable medium;

using the newly copied spare regions in place of the failed regions;

wherein the use status of said spare regions in said first removable medium is managed as part of management of said update count for each removable medium being used; and wherein the copying to said second removable medium is performed if an available size of said spare regions is found to be less than a predetermined threshold value.

10. A controlling method according to claim 8, further comprising the step of ejecting said first removable medium after the contents of said first removable medium have been copied to said second removable medium.

11. A controlling method according to claim 8, further comprising the step of loading a removable medium into said storage system from outside, wherein the loaded removable medium is used as said second removable medium to which to copy the contents of said second removable medium.

12. A storage system comprising:

a cabinet for accommodating a plurality of rewritable removable media;

a drive for performing read and write operations on said removable media;

a transporter for transporting said removable media between said cabinet and said drive; and a controller for controlling said drive and said transporter;

wherein, in response to a request from a host computer, said controller causes said transporter to transport a first removable medium from said cabinet to said drive whereby data are written to storage regions of said first removable medium;

wherein, if data cannot be written to said storage regions, the data to be written to said first removable medium are written to previously furnished spare regions so that said spare regions are used in place of said storage regions; and wherein, if the number of said spare regions in said first removable medium is found to be less than a predetermined value, the data held on said first removable medium are copied to a previously furnished second removable medium.

13. A storage system according to claim 12, further comprising an ejecting element for ejecting said removable media, wherein said controller causes said transporter to transport to said ejecting element said first removable medium of which the contents have been copied to said second removable medium.

14. A storage system according to claim 12, further comprising a loading element for loading removable media from outside, wherein said controller causes said transporter to transport a removable medium placed in said loading element to said cabinet for storage therein as said second removable medium.

* * * * *